United States Patent
Weikard et al.

(12) 
(10) Patent No.: US 6,500,876 B2
(45) Date of Patent: Dec. 31, 2002

(54) COATING COMPOSITION CONTAINING UV-CURABLE URETHANE (METH)ACRYLATES CONTAINING ISOCYANATE GROUPS AND URETHANE (METH)ACRYLATES CONTAINING HYDROXYL GROUPS

(75) Inventors: Jan Weikard, Odenthal (DE); Michael Sonntag, Odenthal (DE); Holger Mundstock, Wermelskirchen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 113 days.

(21) Appl. No.: 09/811,032

(22) Filed: Mar. 16, 2001

(65) Prior Publication Data

US 2001/0038917 A1 Nov. 8, 2001

(30) Foreign Application Priority Data

Mar. 31, 2000 (DE) .......................... 100 16 194

(51) Int. Cl.[7] .............. C08G 18/10; C08F 2/50; C09D 175/16
(52) U.S. Cl. .............. 522/92; 522/93; 522/96; 522/97; 522/98; 522/174; 528/59; 528/60; 528/65; 528/66
(58) Field of Search .............. 522/92, 93, 96, 522/97, 98, 174; 528/59, 60, 65, 66

(56) References Cited

U.S. PATENT DOCUMENTS

| | | | | |
|---|---|---|---|---|
| 3,891,523 A | * | 6/1975 | Hisamatsu et al. | 156/275.5 |
| 4,173,682 A | * | 11/1979 | Noomen et al. | 428/423.1 |
| 4,393,187 A | * | 7/1983 | Boba et al. | 427/493 |
| 4,999,271 A | * | 3/1991 | Etherington et al. | 430/278.1 |
| 5,234,970 A | * | 8/1993 | Kyle | 428/901 |
| 5,578,693 A | * | 11/1996 | Hagstrom et al. | 528/75 |
| 5,684,083 A | * | 11/1997 | Temple et al. | 524/198 |

FOREIGN PATENT DOCUMENTS

| | | |
|---|---|---|
| CA | 2258813 | 1/1998 |
| EP | 287736 | 10/1988 |

OTHER PUBLICATIONS

Database WPI, Section Ch, Week 199735, Derwent Publications LTD., London, GB; AN 1997–383111, XP002170409, & JP 09 167523 A (Hitachi Cable Ltd), Jun. 24, 1997.

* cited by examiner

Primary Examiner—Susan W. Berman
(74) Attorney, Agent, or Firm—Joseph C. Gil; Thomas W. Roy

(57) ABSTRACT

The invention relates to coating compositions containing:
a) urethane (meth)acrylates that contain (meth)acryloyl groups and free isocyanate groups,
b) urethane (meth)acrylates that contain (meth)acryloyl groups and free hydroxyl groups,
c) the UV initiators that initiate radical polymerization and
d) optionally, one or more compounds that react with isocyanates.

8 Claims, No Drawings

COATING COMPOSITION CONTAINING UV-CURABLE URETHANE (METH)ACRYLATES CONTAINING ISOCYANATE GROUPS AND URETHANE (METH)ACRYLATES CONTAINING HYDROXYL GROUPS

BACKGROUND OF THE INVENTION

1. Field of the Invention

The invention relates to a coating composition containing a mixture of ultraviolet(UV)-curable urethane (meth) acrylates containing isocyanate groups and UV-curable urethane (meth)acrylates containing hydroxyl groups, and to the preparation of coatings from these compositions.

2. Description of the Prior Art

EP-A 928 800 (believed to correspond to copending U.S. Ser. No. 09/225,977) describes coating compositions containing:
a) a urethane (meth)acrylate that contains (meth)acryloyl groups and free isocyanate groups,
b) optionally, a further polyisocyanate,
c) a UV initiator that initiates the radical polymerization and
d) one or more compounds that react with isocyanates.

Furthermore, EP-A 928 800 teaches a process in which surfaces are prepared by UV-initiated radical polymerization and the final properties are produced by subsequent NCO reaction. In this process curing of the coating at unexposed or poorly exposed points by NCO reaction ensures a "minimum necessary resistance level". The examples show, however, that the NCO reaction proceeds to completion only as a result of brief heating (30 min, 130° C.) or by standing (7 d) at room temperature for several days.

For some applications, in particular for the coating of heat-sensitive articles or articles that cannot be economically heated to temperatures of approximately 130° C. because of their size and geometry, a curing of the lacquer even without heating and, optionally, without UV exposure is required within a few hours.

It was found that coating compositions that contain urethane (meth)acrylates also containing hydroxyl groups in addition to urethane (meth)acrylates containing isocyanate groups have a substantially improved curing, than compared to coating compositions according to the prior art, especially in unexposed areas.

SUMMARY OF THE INVENTION

The invention relates to a coating composition comprising:
a) urethane (meth)acrylates that contain (meth)acryloyl groups and free isocyanate groups,
b) urethane (meth)acrylates that contain (meth)acryloyl groups and free hydroxyl groups,
c) a UV initiator that initiates radical polymerization and
d) optionally, one or more compounds that react with isocyanates.

DETAILED DESCRIPTION OF THE INVENTION

Preferably, the present coating composition is prepared in two components, wherein component I preferably contains constituent a) and component II contains constituents b), c) and d).

To achieve or improve weathering resistance, the following may optionally be added preferably to component II:
e) a UV absorber having an absorption range up to a maximum of 390 nm,
f) a HALS (hindered amine light stabilizer);
g) lacquer additives, such as flow control agents or deaerating agents and
h) catalysts for accelerating the NCO reaction.

For the purpose of dilution, components I and II may each contain a solvent that is inert with respect to isocyanate groups and C=C double bonds, such as esters, ketones, ethers, ether esters, alkanes or aromatic solvents, such as xylene or toluene.

Component I and component II are combined to provide an equivalent ratio of the NCO groups and the NCO-reactive groups of 2:1 to 0.8:1, preferably of 1.2:1 to 0.8:1.

Compounds a) are prepared from alcohols containing (meth)acryloyl groups and polyisocyanates. Processes for preparing urethane (meth)acrylates are known and are described, for example, in DE-A 1 644 798, DE-A 2 115 373 or DE-A 2 737 406. A review can be found in Chemistry & Technology of UV and EB Formulations for Coatings, Inks & Paints, by P. K. T. Oldring (ed.), vol. 2, 1991, SITA Technology, London, pages 73–123. For the urethane (meth) acrylates containing free isocyanate groups, the molar ratio of NCO groups of the polyisocyanates to the OH groups of the alcohols containing (meth)acryloyl groups is from 1:0.2 to 1:0.8, preferably from 1:0.3 to 1:0.6, particularly preferably 1:0.4 to 1:0.5.

Alcohols containing (meth)acryloyl groups include the esters of acrylic acid or (meth)acrylic acid with dihydric alcohols. Examples include 2-hydroxyethyl, 2- or 3-hydroxypropyl or 2-, 3- or 4-hydroxybutyl (meth)acrylate and any mixture of such compounds. In addition, monohydric alcohols containing (meth)acryloyl groups or reaction products substantially composed of such alcohols that are obtained by esterification of n-hydric alcohols with (meth) acrylic acid are suitable. Mixtures of various alcohols can be used, such that n stands for an integer or a statistical average of greater than 2 to 4, preferably 3. Per mole of the alcohols mentioned, from (n−0.6) to (n−2.2), preferably from (n−0.8) to (n−1.2), and particularly preferably (n−1) moles of (meth) acrylic acid are used. These compounds or product mixtures include the reaction products of (i) trihydric alcohols such as glycerol, trimethylol propane and/or pentaerythritol; low-molecular-weight alkoxylation products of such alcohols (such as ethoxylated or propoxylated trimethylolpropane more specifically the addition product of ethylene oxide to trimethylolpropane having an OH number of 550); or mixtures of at least trihydric alcohols with dihydric alcohols (such as, ethylene glycol or propylene glycol) with
(ii) (meth)acrylic acid in the stated molar ratio. Said compounds have a molecular weight of 116 to 1000, preferably 116 to 750 and more preferably 116 to 158.

Furthermore, the reaction products of said monohydric alcohols containing (meth)acryloyl groups with, for example, ε-caprolactone can also be used. Such products can be obtained, for example, as Tone Monomer 100 supplied by Union Carbide. These compounds have a molecular weight of 230 to 3000, preferably 230 to 1206 and more preferably 344 to 572.

Suitable polyisocyanates include aliphatic, araliphatic and aromatic compounds. Aliphatic compounds are preferred. Examples include butylene diisocyanate, hexamethylene diisocyanate (HDI), isophorone diisocyanate (IPDI), trimethylhexamethylene diisocyanate (=2,2,4- and/or 2,4,4-trimethylhexamethylene diisocyanate), di(isocyanatocyclohexyl)methane, isocyanatomethyl-1,8-octane diisocyanate or their derivatives having a urethane, isocyanurate, allophanate, biuret, uretdione and/or iminooxadiazinedione groups and mixtures of the same. Particularly preferred are the derivatives of HDI and/or IPDI with isocyanurate groups.

The reaction to form urethane (meth)acrylate in accordance with a) can be accelerated in a known manner by means of suitable catalysts, such as tin octoate, dibutyltin dilaurate (DBTL) or tertiary amines.

The resultant urethane (meth)acrylate containing free NCO groups is preferably stabilized against premature polymerization, for example by adding suitable inhibitors and antioxidants including phenols, cresols, hydroquinone and, optionally, also quinones, such as, 2,5-di-tert-butylquinone. Suitable additives of this type are described, for example, in "Methoden der organischen Chemie" ("Methods of organic chemistry") (Houben-Weyl), 4$^{th}$ edition, vol. XIV/1, page 433 ff, Georg Thieme Verlag, Stuttgart 1961.

Said inhibitors are added in amounts of 0.001 to 0.3 wt. % in each case during or following the preparation.

The coating compositions according to the invention can be prepared in solvents that are inert with respect to isocyanate groups and C=C double bonds, such as esters, ketones, ethers, ether esters, alkanes or aromatic solvents, such as xylene or toluene. Urethane (meth)acrylates that contain (meth)acryloyl groups and free hydroxyl groups (component b)) include reaction products of urethane (meth) acrylates with diols, optionally mixed with polyols.

Aliphatic, cycloaliphatic or, less preferably, aromatic diols can be used as diols, for example ethylene glycol, the isomeric propanediols, butanediols, pentanediols, hexanediols, heptanediols, octanediols, and nonanediols and cyclohexanedimethanol, hydrogenated bisphenol-A and derivatives of the above mentioned diols substituted with one or more $C_1$–$C_6$-alkyl groups. Also suitable are diols containing ester groups, ether groups such as (3-hydroxy-2,2-dimethylpropyl)-3-hydroxy-2,2-dimethyl propionate or diethylene glycol, dipropylene glycol, and tripropylene glycol. Preferred are neopentyl glycol, 2,2-dimethyl-1,3-propanediol, 2-ethyl-1,3-hexanediol, 2,5-dimethyl-1,6-hexanediol, 2,2,4-trimethyl-1,3-pentanediol, and 3-hydroxy-2,2-dimethylpropyl 3-hydroxy-2,2-dimethylpropionate. The diols may also be used in the form of their alkoxylation products (ethylene oxide, propylene oxide, and $C_4$-ether units). The use of polyester diols is also possible. These include the reaction products of dicarboxilic acids and/or their anhydrides, ethylenically unsaturated dicarboxylic acids and/or their anhydrides, and lactones (such as ε-caprolactone) with the above mentioned diols. Also suitable is cc,co-dihydroxypolyacrylates (for example, Tegomer BD 1000, supplied by Goldschmidt).

Alcohols, having a hydroxy finctionality of greater than 2, should only be used in a minor amount since the viscosity of the binder otherwise becomes too high for most applications. Examples are glycerol, trimethylolpropane, pentaerythritol and dimethylolpropane or their alkoxylated derivatives, and also hydroxy-functional polymers such as polyacrylates or polyesters.

A photoinitiator component c) may be added for the purpose of curing by high-energy radiation, for example, UV light. These include known photoinitiators described, for example, in Chemistry & Technology of UV and EB Formulations for Coatings, Inks & Paints, by P. K. T. Oldring (ed.), vol. 3, 1991, SITA Technology, London, pages 61–325. Examplesinclude 2-hydroxyphenyl ketones, (for example, 1-hydroxycyclohexyl phenyl ketone), benzil ketals, (for example, benzil dimethyl ketal), acylphosphine oxides (for example, bis(2,4,6-trimethylbenzoyl) phenylphosphine oxide or diacylphosphine oxide), and benzophenone and its derivatives. They are used alone or mixed, optionally also together with further accelerators or co-initiators as additive, in amounts of 0.1 to 10 parts by weight, preferably 2 to 7 parts by weight, particularly preferably 3 to 4 parts by weight, based on solids in the coating composition.

Compounds d) that react with isocyanates include polyols. These can be obtained, for example, by esterifying di- and/or triols, for example neopentyl glycol or trimethylolpropane with di-, tri- or tetracarboxylic acids or their anhydrides, such as, adipic acid, maleic acid or fumaric acid. Suitable hydroxy-functional copolymers are prepared from (meth)acrylic esters, hydroxyalkyl(meth)acrylate esters and, optionally, styrene and/or other monomers such as acrylonitrile. Also suitable are polyetherpolyols, such as those obtained by alkoxylating diols or polyols. Also suitable are sterically hindered amines, such as those prepared by addition of maleic ester to aliphatic primary diamines.

Compounds d) may additionally contain ethylenically unsaturated groups, for example esters of (meth)acrylic acid. Such compounds are prepared, for example, by preparing hydroxy-functional copolymers, such as polyacrylates, using epoxide-bearing monomers. The epoxide groups are reacted in a further step with (meth)acrylic acid. Also, polyester acrylates or polyether acrylates can also be used, for example those described in Chemistry & Technology of UV & EB Formulations for Coatings, Inks & Paints, by P. K. T. Oldring (ed.), vol. 2, 1991, SITA Technology, London, pages 123–135, provided they have free hydroxyl groups.

To achieve weathering resistance of the cured coating layer, a UV absorber having an absorption range up to 390 nm max. and a HALS stabilizer can preferably be added to the component II. Suitable UV absorbers include the triphenyltriazines, for example Tinuvin 400 (Ciba) or the oxalic acid dianilides, for example Sanduvor 3206 (Clariant). The UV absorbers are preferably added in amounts of, in each case, 0.5 to 3.5% based on the solid binder. Suitable HALS stabilizers include the commercially available, Tinuvin 292 or Tinuvin 123 (Ciba) or Sanduvor 3058 (Clariant). The HALS stabilizers are preferably added in amounts of 0.5 to 2.5%, based on the solid binder.

Lacquer additives g) include deaerating agents, such as polyacrylates, and flow control agents, such as polysiloxanes.

Suitable solvents are solvents that are inert with respect to isocyanate groups and C=C double bonds, such as esters, ketones, ethers, ether esters, alkanes or aromatic solvents, such as xylene or toluene.

If all the constituents of the coating composition according to the invention are formulated as one component, the system has a limited pot life. A preferred type of formulation is, however, a two-component system, component I containing constituent a) and component II containing constituents b), c) and d) and also, optionally constituents e) to h). The respective components are then storage-stable as long as the constituents themselves. Both components are mixed in the specified ratio prior to application or applied by means of so-called two-component systems.

The coating composition according to the invention can be applied with all the standard application methods, such as spraying, casting or roller application, preferably by means of spray application. The applied coating composition can be cured in the consecutive steps of.

Step 1: By extraction of the optionally added solvents. This takes place at room temperature or elevated temperature, preferably up to 80° C.

Step 2: By UV curing with commercial mercury high-pressure and medium-pressure radiators whereby it is possible for the radiators to be doped with other elements. They preferably have a power of 80 to 240 W/cm lamp length.

Step 3: By crosslinking the NCO-containing constituents with the constituents that react with NCO-containing constituents. This may take place above 0C, preferably at or above room temperature or at elevated temperature, advantageously below 150° C. Preferably, this reaction takes place at room temperature in the case of heat-sensitive substrates and in the case of applications that make heating of the substrate uneconomical because of its size and/or shape. Thereby curing takes place also at points not exposed during step 2 (for example, folds, wrap-rounds, angles or other concealed points). As expected curing only by the NCO—OH reaction and by physical effects provide coatings that are not as solvent-resistant and scratch-resistant as the coating additionally cured by WV, but the level of resistance in the shaded zones is surprisingly good, as is further explained by the examples.

A possible variation of this curing process is to allow the reaction of the NCO-containing constituents to proceed partly during the WV curing by increasing the ambient temperature.

The invention further relates to coated heat-sensitive articles. Said articles can also assume complex (complicated) three-dimensional shapes that are only accessible with difficulty to curing of the applied coating agent by means of WV radiation alone.

EXAMPLES

Urethane Acrylate A Containing NCO Groups:

790.3 g of Desmodur VP LS 2103 (experimental product of Bayer AG, Leverkusen, polyisocyanate substantially containing HDI isocyanurates with an NCO content of 18.0 wt. %, viscosity 2000 mPa·s at 23° C., 90% in butyl acetate) were dissolved in 152 g of butyl acetate. 1.0 g of 2,6-di-tert-butyl-4-methylphenol and 1.0 g of dibutyltin dilaurate were added thereto. The solution was heated to 60° C. while passing air through it and stirring. The heat source was removed and 209.7 g of 2-hydroxyethyl acrylate were added dropwise in a manner such that the temperature was between 55 and 65° C. Then reaction was continued at 60° C. until the NCO content was below 5.8%.

Urethane Acrylate B Containing NCO Groups:

552.0 g of Desmodur N 3600 (commercial product of Bayer AG, Leverkusen, poly-isocyanate substantially containing HDI isocyanurates, NCO content: 23.4 wt. %, viscosity 1200 mPa·s at 23° C.) were dissolved in 167 g of n-butyl acetate. 1.6 g of 2,6-di-tert-butyl-4-methylphenol were added thereto. The solution was heated to 60° C. while passing air through it and stirring. The heat source was removed and 116.0 g of 2-hydroxyethyl acrylate were added dropwise in such a way that the temperature was between 55 and 65° C. Then reaction was continued at 60° C. until the NCO content was less than 10.4%.

Urethane Acrylate C Containing OH Groups:

640.8 g of Desmodur Z 4470 BA (commercial product of Bayer AG, Leverkusen, polyisocyanate substantially containing IPDI isocyanurates, NCO content: 11.8 wt. %, viscosity 1500 mPa·s at 23° C., 80% in butyl acetate) were taken. 1.0 g of 2,6-di-tert-butyl-4-methylphenol and 1.0 g of dibutyltin dilaurate were added thereto.

The solution was heated to 60° C. while passing air through it and stirring. The heat source was removed and 99.3 g of hydroxyethyl acrylate were added dropwise in such a way that the temperature was between 55 and 65° C. Then reaction was continued at 60° C. until the NCO content remained constant. Reaction was then continued with 249.9 g of 2,2,4-trimethyl-1,5-pentanediol until the NCO content was below 0.1%. The solids content was then adjusted to 80% with butyl acetate.

Urethane Acrylate D Containing OH Groups:

The preparation of urethane acrylate C containing OH groups was repeated with the difference that 291.3 g of 3-hydroxy-2,2-dimethylpropyl 3-hydroxy-2,2-dimethylpropionate were used instead of 2,2,4-trimethyl-1,5-pentadiol.

Urethane Acrylate E Containing OH Groups:

The preparation of urethane acrylate C containing OH groups was repeated with the difference that 150.0 g of 2-hydroxyethyl acrylate were used instead of 99.3 g and 190.0 g of 2,2,4-trimethyl-1,5-pentadiol were used instead of 249.5 g.

The following coating composition according to the invention, inter alia, was formulated: binder content 54 wt. %, flow time with DIN 4 beaker (4 mm DIN 53211 nozzle) approximately 20 s.

| Formulation No | Urethane acrylate A containing NCO groups, pbw | Urethane acrylate E containing OH groups, pbw | Polyol Desmo-phen VP LS 2089[1], 75% butyl acetate, pbw | Photo-initiator Irgacure 184[2] 50% butyl acetate, pbw | Additives and solvents |
|---|---|---|---|---|---|
| 1 | 36.5 | 20.8 | 10.1 | 4.4 | 28.2[3] |

Formulation No. 2: Example 2 in EP-A 928 800 was adopted as a comparison.
[pbw = parts by weight]
[1]Polyester polyol experimental product supplied by the company Bayer AG, Leverkusen, (aliphatic polyester polyol, hydroxyl content 6,0%, viscosity 10 Pa · s, 75% in butyl acetate, equivalent weight approx. 283 g)
[2]Ciba Spezialitatenchemie, Lampertheim
[3]Made of [pbw]:
24.8 butyl acetate,
0.2 Byk 331 (by Byk-Chemie) 50% in butyl acetate, [leveling agent]
0.2 Modaflow (by Monsanto), 1% in xylene 0.2, [flow agent]
1.0 Sanduvor 3206 (by Clariant), [UV Absorber]
0.5 Sanduvor 3058 (by Clariant) [HALS]
1.5 DBTL (by RheinChemie) 1% in butyl alcetate [catalyst] Dibutyl-tin-dilaurate Immediately after preparation, the formulated coatings were applied by means of compressed-air spray application (nozzle 1.3 mm diameter, spraying pressure 3.5 bar) to glass plates and steel sheets; the latter was coated with a primer coating and a standard car repair base lacquer (resultant layer thickness approximately 40–50 μm). The plates were predried for 10 min at 60° C. and they were then conveyed underneath a mercury high-pressure radiator (80 W/cm) at various belt speeds (*). In this process, the UV reactivity of the systems was tested until surface inhibition occurred (i.e. the lacquer surface was not cured after UV irradiation). Further tests served to characterize coating properties after a UV curing of 2 m/min (**):

| Formulation | No. 1 | No. 2 |
|---|---|---|
| UV curing up to (*) | 5 m/min | 5 m/min |
| König pendulum hardness (sec) (**) | 96 | 106 |
| Solvent resistance:[1] (**) Bz/EtOH/MPA/X/BA | 0/0/0/0/0 | 0/0/0/0/0 |

[1] Assessment of the coating surface after an exposure time of 10 min: 0 = unaltered, 5 = destroyed Bz/EtOH/MPA/X/BA: petrol/ethanol/methoxypropyl acetate/xylene/butyl acetate The drying of the lacquers without UV irradiation was tested in parallel. The degree of dryness 1 (T1) according to DIN 53150 was measured.:

| Formulation | No. 1 | No. 2 |
|---|---|---|
| Degree of dryness 1 was obtained after | 2.5 h | >8 h |

The comparison of the two formulations showed that a substantially faster drying without UV irradiation of the systems was achieved by the novel binder system with comparable properties under UV irradiation.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition comprising:
   a) urethane (meth)acrylates that contain (meth)acryloyl groups and free isocyanate groups,
   b) urethane (meth)acrylates that contain (meth)acryloyl groups and free hydroxyl groups,
   c) a ultraviolet initiator that initiates radical polymerization and
   d) optionally, one or more compounds that react with isocyanates.

2. The coating composition according to claim 1, wherein the compound that reacts with isocyanate is a polyol.

3. The coating composition according to claim 1, wherein the compound that reacts with isocyanate contains ethylenically unsaturated groups.

4. The coating composition according to claim 1, wherein a further compound that reacts with isocyanate is a sterically hindered, secondary, polybasic amine.

5. The coating composition according to claim 1, further comprising a UV absorber having an absorption range of up to 390 nm.

6. The coating composition according to claim 1, further comprising a HALS amine.

7. A heat-sensitive article coated with a coating composition according to claim 1.

8. An article having complex three-dimensional shape coated with a coating composition according to claim 1.

* * * * *